United States Patent
Boucher et al.

(10) Patent No.: US 6,957,208 B1
(45) Date of Patent: Oct. 18, 2005

(54) METHOD, APPARATUS, AND ARTICLE OF MANUFACTURE FOR PERFORMANCE ANALYSIS USING SEMANTIC KNOWLEDGE

(75) Inventors: Michael L. Boucher, Lafayette, CO (US); Shaun M. Dennie, Lafayette, CO (US); Paul J. Hinker, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 624 days.

(21) Appl. No.: 09/699,628

(22) Filed: Oct. 31, 2000

(51) Int. Cl.$^7$ .............................. G06N 7/00; G06N 7/08
(52) U.S. Cl. ............................. 706/55; 706/45; 706/46
(58) Field of Search ............................ 706/55, 45, 46

(56) References Cited

U.S. PATENT DOCUMENTS

| | | | |
|---|---|---|---|
| 4,675,832 A | 6/1987 | Robinson et al. | |
| 4,685,082 A | 8/1987 | Cheung et al. | |
| 4,812,996 A | 3/1989 | Stubbs | |
| 5,073,851 A | 12/1991 | Masterson et al. | |
| 5,075,847 A | 12/1991 | Fromme | |
| 5,079,707 A | 1/1992 | Bird et al. | |
| 5,119,465 A | 6/1992 | Jack et al. | |
| 5,146,593 A | 9/1992 | Brandle et al. | |
| 5,168,563 A | * 12/1992 | Shenoy et al. | ................ 703/19 |
| 5,179,702 A | 1/1993 | Spix et al. | |

(Continued)

FOREIGN PATENT DOCUMENTS

| | | |
|---|---|---|
| DE | 199 34 515 A1 | 1/2000 |
| EP | 0390339 A2 * | 1/1990 |
| EP | 0 390 339 A2 | 10/1990 |
| EP | 0 703 534 A1 | 3/1996 |
| EP | 0 817 044 A2 | 1/1998 |
| EP | 0 965 921 A2 | 12/1999 |
| EP | 1 024 432 A | 8/2000 |
| EP | 1 026 592 A2 | 8/2000 |
| EP | 1 081 585 A1 | 3/2001 |
| FR | 2 793 908 A1 | 11/2000 |
| GB | 2 324 942 A | 11/1998 |
| GB | 2 343 029 | 4/2000 |
| GB | 2 357 873 | 7/2001 |
| JP | 03-282731 A | 12/1991 |
| JP | 07-056716 A | 3/1995 |
| WO | WO 99/10812 A1 | 3/1999 |

OTHER PUBLICATIONS

Cooper, Keith D., et al., "An Experiment with Inline Substitution," *Software–Practice and Experience*, vol. 21, No. 6, Jun. 1991, pp. 581–601.

Holland, Angela, et al., Compiler for Selective Procedure Inlining, *ACM 31$^{st}$ Annual Southeast Conference*, 1993, pp. 207–212.

Ayers, Andrew et al., "Aggressive Inling", ACM PLDI, pp. 134–145, 1997.

(Continued)

*Primary Examiner*—Joseph P. Hirl
(74) *Attorney, Agent, or Firm*—Finnegan, Henderson, Farabow, Garrett & Dunner LLP

(57) ABSTRACT

Methods and systems consistent with this invention analyze the performance of a program executed in a data processing system. Such methods and systems assign a semantic to the performance of the program, and measure the level of performance of the program based on the semantic. As part of assigning a semantic, such methods and systems indicate a class of processing of which to measure performance, and may define a suctitude associated with the class. Such methods and systems define the class as a processing function that could contribute to the poor performance of the program. As part of measuring the level of performance, such methods and systems measure the suctitude of the indicated class during program execution.

45 Claims, 5 Drawing Sheets

U.S. PATENT DOCUMENTS

| | | |
|---|---|---|
| 5,274,813 A | 12/1993 | Itoh |
| 5,274,821 A | 12/1993 | Rouquie |
| 5,297,274 A | 3/1994 | Jackson |
| 5,301,312 A | 4/1994 | Christopher, Jr. et al. |
| 5,325,499 A | 6/1994 | Kummer et al. |
| 5,325,533 A | 6/1994 | McInerney et al. |
| 5,353,401 A | 10/1994 | Iizawa et al. |
| 5,390,314 A | 2/1995 | Swanson |
| 5,438,659 A | 8/1995 | Notess et al. |
| 5,450,542 A | 9/1995 | Lehman et al. |
| 5,463,775 A | 10/1995 | DeWitt et al. |
| 5,485,574 A | 1/1996 | Bolosky et al. |
| 5,485,619 A | 1/1996 | Lai et al. |
| 5,497,458 A | 3/1996 | Finch et al. |
| 5,499,349 A | 3/1996 | Nikhil et al. |
| 5,500,881 A | 3/1996 | Levin et al. |
| 5,519,866 A | 5/1996 | Lawrence et al. |
| 5,530,816 A | 6/1996 | Holt |
| 5,535,364 A | 7/1996 | Resman et al. |
| 5,535,393 A | 7/1996 | Reeve et al. |
| 5,539,907 A * | 7/1996 | Srivastava et al. .......... 717/130 |
| 5,553,235 A | 9/1996 | Chen et al. |
| 5,574,922 A | 11/1996 | James |
| 5,613,063 A | 3/1997 | Eustace et al. |
| 5,636,374 A | 6/1997 | Rodgers et al. |
| 5,640,550 A | 6/1997 | Coker |
| 5,673,387 A | 9/1997 | Chen et al. |
| 5,675,790 A | 10/1997 | Walls |
| 5,675,802 A | 10/1997 | Allen et al. |
| 5,689,712 A | 11/1997 | Heisch |
| 5,696,937 A | 12/1997 | White et al. |
| 5,710,727 A | 1/1998 | Mitchell et al. |
| 5,724,262 A | 3/1998 | Ghahramani |
| 5,734,822 A | 3/1998 | Houha et al. |
| 5,737,605 A | 4/1998 | Cunningham et al. |
| 5,740,431 A | 4/1998 | Rail |
| 5,740,433 A | 4/1998 | Carini |
| 5,742,793 A | 4/1998 | Sturges et al. |
| 5,745,897 A | 4/1998 | Perkins et al. |
| 5,748,892 A | 5/1998 | Richardson |
| 5,748,961 A | 5/1998 | Hanna et al. |
| 5,754,820 A | 5/1998 | Yamagami |
| 5,761,426 A | 6/1998 | Ishizaki et al. |
| 5,774,724 A | 6/1998 | Heisch |
| 5,784,698 A | 7/1998 | Brady et al. |
| 5,787,480 A | 7/1998 | Scales et al. |
| 5,805,795 A | 9/1998 | Whitten |
| 5,812,799 A | 9/1998 | Zuravleff et al. |
| 5,835,705 A | 11/1998 | Larsen et al. |
| 5,850,554 A | 12/1998 | Carver |
| 5,860,024 A | 1/1999 | Kyle et al. |
| 5,864,867 A | 1/1999 | Krusche et al. |
| 5,867,649 A | 2/1999 | Larson |
| 5,867,735 A | 2/1999 | Zuravleff et al. |
| 5,872,977 A | 2/1999 | Thompson |
| 5,890,171 A | 3/1999 | Blumer et al. |
| 5,905,488 A | 5/1999 | Demers et al. |
| 5,905,856 A | 5/1999 | Ottensooser |
| 5,913,223 A | 6/1999 | Sheppard et al. |
| 5,920,895 A | 7/1999 | Perazzoli, Jr. et al. |
| 5,963,975 A | 10/1999 | Boyle et al. |
| 5,968,114 A | 10/1999 | Wentka et al. |
| 5,970,510 A | 10/1999 | Sher et al. |
| 5,974,510 A | 10/1999 | Cheng et al. |
| 5,974,536 A | 10/1999 | Richardson |
| 5,978,892 A | 11/1999 | Noel et al. |
| 5,987,479 A | 11/1999 | Oliver |
| 5,991,708 A | 11/1999 | Levine et al. |
| 5,991,893 A | 11/1999 | Snider |
| 6,006,031 A | 12/1999 | Andrews et al. |
| 6,009,514 A | 12/1999 | Henzinger et al. |
| 6,014,517 A | 1/2000 | Shagam et al. |
| 6,016,474 A | 1/2000 | Kim et al. |
| 6,018,793 A | 1/2000 | Rao |
| 6,023,583 A | 2/2000 | Honda |
| 6,044,438 A | 3/2000 | Olnowich |
| 6,049,798 A | 4/2000 | Bishop et al. |
| 6,049,855 A | 4/2000 | Jeddeloh |
| 6,052,708 A | 4/2000 | Flynn et al. |
| 6,052,763 A | 4/2000 | Maruyama |
| 6,055,368 A | 4/2000 | Kunioka |
| 6,065,019 A | 5/2000 | Ault et al. |
| 6,066,181 A | 5/2000 | DeMaster |
| 6,072,951 A | 6/2000 | Donovan et al. |
| 6,077,312 A | 6/2000 | Bates et al. |
| 6,081,868 A | 6/2000 | Brooks |
| 6,085,029 A | 7/2000 | Kolawa et al. |
| 6,088,771 A | 7/2000 | Steely, Jr. et al. |
| 6,098,169 A | 8/2000 | Ranganathan |
| 6,101,325 A | 8/2000 | Flaat |
| 6,101,525 A | 8/2000 | Hecker |
| 6,108,343 A | 8/2000 | Cruickshank et al. |
| 6,119,198 A | 9/2000 | Fromm |
| 6,125,430 A | 9/2000 | Noel et al. |
| 6,141,692 A | 10/2000 | Loewenstein et al. |
| 6,145,054 A | 11/2000 | Mehrotra et al. |
| 6,167,565 A | 12/2000 | Kanamori |
| 6,173,327 B1 | 1/2001 | De Borst et al. |
| 6,173,368 B1 | 1/2001 | Krueger et al. |
| 6,205,537 B1 | 3/2001 | Albonesi |
| 6,223,134 B1 | 4/2001 | Rust et al. |
| 6,249,906 B1 | 6/2001 | Levine et al. |
| 6,253,252 B1 | 6/2001 | Schofield |
| 6,263,485 B1 | 7/2001 | Schofield |
| 6,269,457 B1 | 7/2001 | Lane |
| 6,282,702 B1 | 8/2001 | Ungar |
| 6,286,130 B1 | 9/2001 | Poulsen et al. |
| 6,295,600 B1 | 9/2001 | Parady |
| 6,304,951 B1 | 10/2001 | Mealey et al. |
| 6,311,320 B1 | 10/2001 | Jibbe |
| 6,314,429 B1 | 11/2001 | Simser |
| 6,317,871 B1 | 11/2001 | Andrews et al. |
| 6,341,338 B1 | 1/2002 | Dennie |
| 6,351,845 B1 | 2/2002 | Hinker et al. |
| 6,353,829 B1 | 3/2002 | Koblenz et al. |
| 6,353,869 B1 | 3/2002 | Ofer et al. |
| 6,366,994 B1 | 4/2002 | Kalyur |
| 6,369,725 B1 | 4/2002 | Busaba |
| 6,430,657 B1 | 8/2002 | Mittal et al. |
| 6,434,714 B1 * | 8/2002 | Lewis et al. .................. 714/38 |
| 6,438,745 B1 | 8/2002 | Kanamaru et al. |
| 6,442,162 B1 | 8/2002 | O'Neill et al. |
| 6,473,833 B1 | 10/2002 | Arimilli et al. |
| 6,480,818 B1 | 11/2002 | Alverson et al. |
| 6,496,902 B1 | 12/2002 | Faanes et al. |
| 6,502,136 B1 | 12/2002 | Higuchi et al. |
| 6,523,090 B2 | 2/2003 | Tremblay |
| 6,542,919 B1 | 4/2003 | Wendorf et al. |
| 6,574,725 B1 | 6/2003 | Kranich et al. |
| 6,629,214 B1 | 9/2003 | Arimilli et al. |
| 6,647,546 B1 | 11/2003 | Hinker et al. |
| 6,684,296 B2 | 1/2004 | Hayter et al. |
| 2001/0003831 A1 | 6/2001 | Boland |
| 2001/0051974 A1 | 12/2001 | Saad |
| 2002/0046201 A1 | 4/2002 | Hambry |
| 2002/0073360 A1 * | 6/2002 | Lewis et al. .................. 714/38 |
| 2002/0078010 A1 | 6/2002 | Ehrman et al. |
| 2003/0061395 A1 | 3/2003 | Kingsbury et al. |

OTHER PUBLICATIONS

HWU, Wen–Mei W. et al., "Inline Function Expansion for Compiling C Programs", ACM, pp. 246–257, 1989.

Ogasawara, Takeshi et al., "A Study of Exception Handling and Its Dynamic Optimization in Java", ACM OOPSLA, pp. 83–95, 2001.

Suganuma, Toshio et al., "A Region–Based Compilation Technique for a Java Just–in–Time Compiler", ACM PLDI, pp. 312–323, Jun. 2003.

Kamp, Poul–Henning, "Malloc(3) in modern Virtual Memory environments", Freebsd Online Documentation, Apr. 5, 1996, pp. 1–7.

"Visual Basic 5.0 Introduction," Windows 95 Student Manual, 1997, pp. V–VI; 1–278.

Cantrill, B.M. et al., "ThreadMon: A Tool for Monitoring Multithreaded Program Performance," System Sciences, pp. 253–265.

Grundy, J.C., et al., "Supporting Flexible Consistency Management Via Discrete Change Description Propagation," Software Practice & Experience, John Wiley & Sons Ltd., vol. 26, Sep. 1996 No. 9, pp. 1053–1083.

Karavanic K.L. et al., "Integrated Visualization of Parallel Program Performance Data," vol. 23, 1997, pp. 181–198.

Xu, Miller & Naim, "Dynamic Instrumentation of Threaded Applications," Internet Article, Online, URL:ftp://ftp.cs.wisc.edu/paradyn/technical papers/threads.pdf Oct. 29, 2998, pp. 1–17.

Purtilo, J. et al., "Module Reuse by Interface Adaption", Sofware–Practice and Experience, 1991, pp. 539–556.

"Code Complete: A Practical Handbook of Software Construction," Steve McConnell, Chapter 19–Self–Documenting Code, http://library. books24X7.com/book/id 2835/viewer.asp?pr=1, 1993, Microsoft Press.

Handy, Jim, "The Cache Memory Book", Second Edition, 1998, pp. 55, 66, 67, 155.

IBM Technical Disclosure Bulletin, "Catching Objects in a Data Space," Oct. 1, 1994, vol. No. 37, pp. 587–590.

Metcalf, Michael, "CERN," Geneva 1991, 1997 pp. 1–27, ftp://ftp>numerical.rl.ac.uk/pub/MandR/convert.f90.

"dcpid –Digital Continuous Profiling Infrastructure daemon", Man pages for SCR–Installed Programs (Alpha/NT), Online URL:http://research.compag.com/SRC/dcpi/html/ntalpha/dcpi.html, 1997, pp. 1–6.

Brown et al., "PAPI: Portable Interface to Hardware Performance Counters," Cewes Major Shared Resources Center Pet Technical Reports, vol. 99–06, 1999, Online, URL:http://www.wes.hpc.mil/pet/tech reports/reports/pdf/tr 9906.pdf, p. 313.

IBM Technical Disclosure Bulletin, "Internal Performance Measurement Counters," IBM Corp., vol. 34, No. 4A, Sep. 1991, pp. 51–52.

IBM Technical Disclosure Bulletin, "Simultaneous Viewing of Performance Monitor Data Independent of Counters, " IBM Corp., vol. 39, No. 10, Oct. 1996, pp. 181–183.

Zagha et al., "Performance Analysis Using the MIPS R10000 Performance Counters", SC96 Technical Papers, Online, URL:http://www.supercomp.org/sc96/proceedings/SC96Proc/Zagha/Index.HTM, Nov. 1996, pp. 1–22.

Valvano, "Debugging Strategies," Chapter 6, pp. 6.1–6.10, Real Time Debugging, Online Manual, Jun. 7, 1999, Retrieved from the Internet: URL:http://www.ece.utexas.edu/{valvano/EE360P/PDF/Ch6.pdf.

Broberg et al., "Visualization and Performance Prediction of Multithreaded Solaris Programs by Tracing Kernel Threads", Department of Software Engineering and Computer Science, University of Kariskrona/Ronneby, Sweden, 7 pages.

Haggander et al., "Optimizing Dynamic Memory Management in a Multithreaded Application Executing on a Multiprocessor," International Conference on Parallel Processing, Minneopolis, MN, Aug. 10–14, 1998, pp. 262–269.

Larson et al., "Memory Allocation for Long–Running Server Applications," ISMM 1998, International Symposium on Memory Management, Vancouver, BC, Canada, Oct. 17–19, 1998, vol. 34, No. 3, pp. 176–185.

"Algorithm Visualization System: Introduction," available online at:www.cp/eng.chula.ac.th/faculty/spi/research/avis/intro.html as of Jun. 10, 1999, 2 pages.

"GeoMamos Project Home Page," available online at:www.ece.nwu,edu/–theory/geomamos.html as of Jun. 10. 1999, 4 pages.

"Introduction," available online at:www.ece.nwu.edu/–theory/gs tech 1 html/section 3 1.html as of Jun. 10, 1999, 3 pages.

"Pentium Processor Family User Manual vol. 3: Architechture and Programming Manual," pp. 25–182,25–183, 25–309, and 25–309, and Intel Corp. (1994).

"Purify for Windows NT, Product Overview," Ver. 6.0, available online at:www.rational.com/products/purify_nt/prodinfo/index.jtmpl as of Jan. 11, 1999, 3 pages.

"Scientific Simulations and Algorithm Visualizations Using NESL and Java," available online at:www.cs.cmu.edu/–scandal/applets/ as of Jun. 10, 1999, 1 page.

"Visualization for Developing Geometric Algorithms," available online at:www.ece.nwu.edu/–theorgy/gs tech 1 htm/section 3 3.html as of Jun. 10, 1999, 2 pages.

Attali et al., "Sematic–Based Visualization for Parallel Object–Oriented Programming," Proceedings of the 11th Annual Conference on Object Oriented Programming Systems, 1996, pp. 421–440.

Barry Wilkinson et al., "Parallel Programming," Prentice Hall, 1999.

Conradi et al., "Version Models for Software Configuration Management," ACM Computing Surveys, vol. 30, No. 2, Jun. 1998, pp. 232–282.

David E. Culler et al., "Parallel Computer Architecture", Morgan Kaufman Publishers, Inc., San Francisco, California, 1999.

Kevin Dowd and Charles R. Severance, "High Performance Computing," Second Edition, Chapter 10, Shared Memory Multiprocessors, Aug. 1998, pp. 216–218.

Sun Microsystems Computer Company, "Prism 5.0 Reference Manual," Revision A., Nov. 1997.

Sun Microsystems, "UltraSPARC User's Manual," UltraSPARC–1, UltraSPARC–II, Jul. 1997, pp. 319–325.

Wasserman et al., "A Graphical, Extensible Integrated Environement for Software Development" Proceedings of the ACD Sigsoft/Sigplan Software Engineering Symposium on Practical Software Development Environmentals, 1986, pp. 131–142.

Nathan P. Kropp, Philip J. Koopman, Daniel P. Siewiorek, "Automated Robustness Testing of Off–the–Shelf Software Components," Institute for Complex Engineered Systems, Carnegie Mellon University, Pittsburgh, PA, pp. 230–239, IEEE (1998).

Ian Foster, "Designing and Building Parallel Programs", Addison–Wesley Publishing Company, 1995.

Microsoft Press Computer Dictionary, Third Edition, Microsoft Corporation (1997), p. 101.

Purtilo, J., et al., "Module Reuse by Interface Adaptation," Software –Practice and Experience, Jun. 1991, pp. 539–556.

Buckley, A., "Conversion to Fortran 90: A Case Study," ACM Transactions on Mathematical Software, 1994, pp. 308–353.

* cited by examiner

METHOD, APPARATUS, AND ARTICLE OF MANUFACTURE FOR PERFORMANCE ANALYSIS USING SEMANTIC KNOWLEDGE

FIELD OF THE INVENTION

The present invention relates to the field of performance analysis, and more particularly to performance analysis using semantic knowledge.

BACKGROUND OF THE INVENTION

Computer systems execute programs that solve complex computational problems.

Preferably, the programs achieve high levels of performance, reduce wasted computer resources, and execute at peak speed. "Performance analysis" is the process of analyzing and understanding the execution characteristics of programs to identify impediments that prevent programs from running at peak speed, or their highest level of performance.

The amount of information required to completely characterize the execution of a program is massive, however, and it is therefore difficult or impossible to analyze all the data manually. Current automatic "performance analyzers" present performance data textually or graphically and direct the user's attention to patterns that may indicate a performance problem. These tools, however, lack an understanding of the meaning, or "semantic knowledge," of the analyzed program, which limits their effectiveness in solving performance problems.

For example, performance analyzers generally attempt to identify algorithms that ineffectively use computer resources. To do this, conventional performance analyzers may identify parts of a program that take a long time to execute. This heuristic, however, may be deceptive. For instance, such an analyzer would identify a well-written algorithm as a poorly-performing algorithm simply because it unavoidably requires a lot of time to execute. Such an analyzer would also fail to identify poorly-performing algorithms because they do not take a long time to execute or because they are not central to the program. Without knowledge of the semantics of the programs, or how program components are supposed to run, an automatic performance analyzer cannot adequately determine whether a particular component of a program exhibits poor performance.

Performance analysis is also important in multiprocessing computer systems. A multiprocessing computer system comprises multiple processors in which different portions of a program execute in parallel in the different processors. Or, it is a system in which a program executes in parallel over multiple computers, each with a different processor. In such a computer system, resources may be wasted if processors are idle (i.e., not executing a program instruction) for any length of time. Thus, an automatic performance analyzer identifies algorithms that do not effectively divide tasks over the available processors, i.e., they have low "parallelism." Conventional performance analyzers generally attempt to identify algorithms with low parallelism by indicating instances during program execution when one or more of the processors are idle. This may indicate when the program is not using the available processor resources as well as it could. Such a heuristic, however, may also identify instances when processors are expected to be idle, such as during the traversal of a linked list by a single processor. Further, even during the course of executing an extremely efficient program, the number of instances that one or more processors may be idle could be one billion or more. Conventional automated performance analyzers are incapable of distinguishing instances when the processors are expected to be idle from instances when they are not. Therefore, without knowledge of the semantics of the program, or how program components are supposed to run, automatic performance analyzers cannot adequately determine low parallelism portions of programs.

Thus, there is a need for performance analysis that identifies performance impediments based on an understanding of the meaning, or semantic knowledge, of the portions of the program being analyzed.

SUMMARY OF THE INVENTION

Methods and systems consistent with this invention analyze the performance of a program executed in a data processing system. Such methods and systems assign a semantic to the performance of the program, and measure the level of performance of the program based on the semantic. As part of assigning a semantic, such methods and systems indicate a class of processing of which to measure performance, and may define a suctitude, i.e. a degree of poor performance, associated with that class. Such methods and systems define the class as a processing function that could contribute to the poor performance of the program. As part of measuring the level of performance, such methods and systems measure the suctitude of the indicated class during program execution.

The summary and the following detailed description should not restrict the scope of the claimed invention. Both provide examples and explanations to enable others to practice the invention.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Overview

The following description of embodiments of this invention refers to the accompanying drawings. Where appropriate, the same reference numbers in different drawings refer to the same or similar elements.

Methods and systems consistent with this invention provide a performance analysis tool that identifies performance impediments based on an understanding of the meaning, or semantic knowledge, of the portions of the program being analyzed. Such methods and systems assign a semantic to the performance of the program, and then measure the level of performance of the program based on the semantic. The semantic may comprise a class of processing and a suctitude, i.e. a degree of poor performance, associated with the class. A class is anything that could contribute to the poor performance of a computer program. Use of semantic knowledge facilitates identification of impediments that prevent the program from executing a peak speed.

Implementation Details

Figure 1:
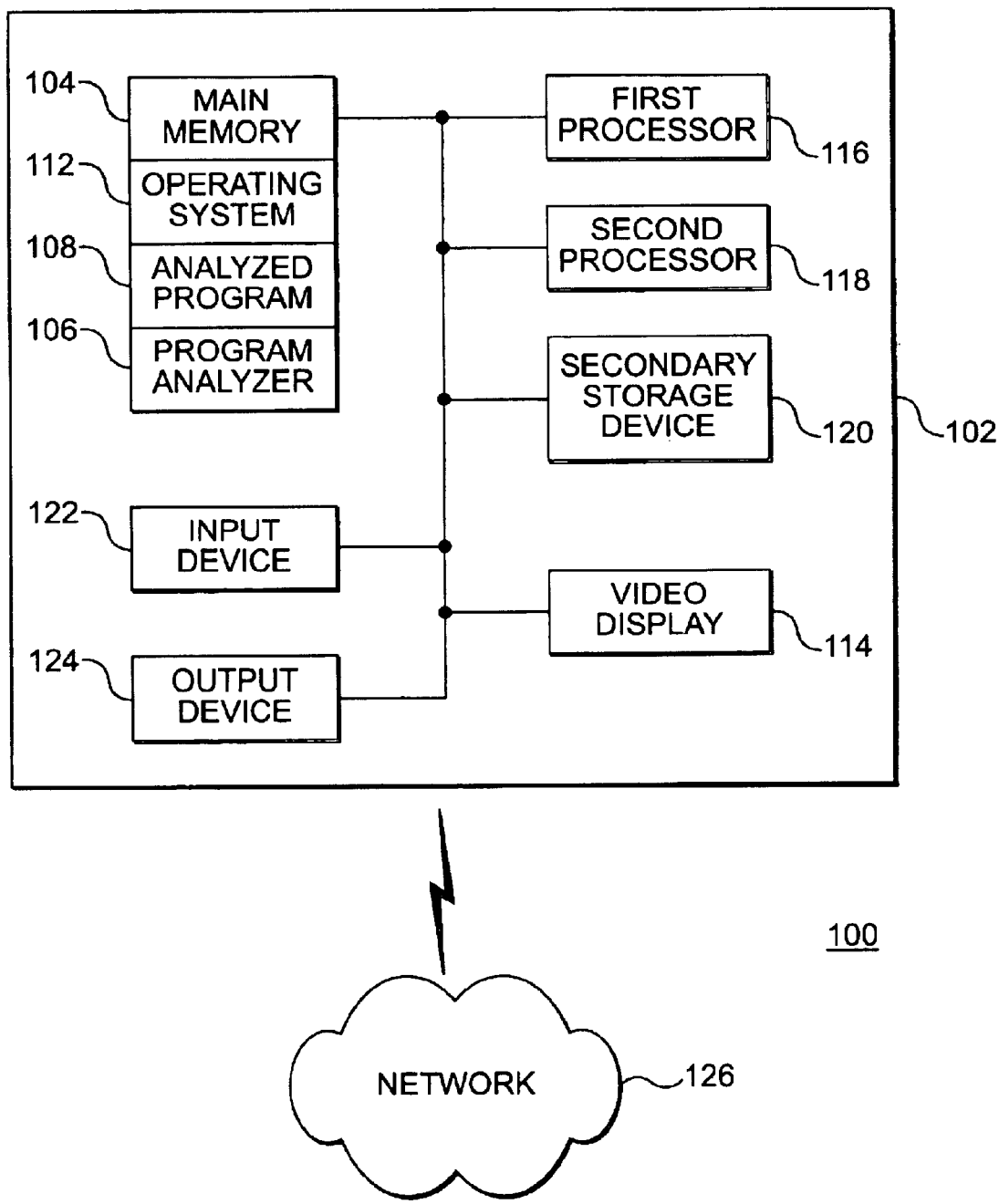
FIG. 1 depicts a data processing system suitable for use with methods and systems consistent with this invention.

FIG. 1 depicts a data processing system suitable for use with methods and systems consistent with this invention. Data processing system 100 comprises a computer 102 attached to a network 126. Computer 102 comprises a main memory 104, a first processor 116, a second processor 118, a secondary storage device 120, an input device 122, an output device 124, and a video display 114. Main memory 104 may comprise an operating system 112, an analyzed program 108, and a performance analyzer program 106. First processor 116 or second processor 118 execute analyzed program 108 and performance analyzer 109, but not necessarily at the same time.

Methods and systems consistent with this invention first gather data concerning the execution characteristics of program 108. The process of gathering information for performance analysis is called "instrumentation." Instrumentation requires adding instructions to analyzed program 108 so that when it executes, these instructions generate data from which performance analyzer 106 derives performance information. For example, in "subprogram level instrumentation," each subprogram is instrumented with a set of instructions that generate data reflecting calls to the subprogram. This allows, for example, the tracking of the number times the subprogram is called. Performance analyzer 106 may analyze the instrumentation data generated during execution of program 108 after program 106 is finished executing. Alternatively, performance analyzer 106 may analyze the data during execution of program 108. An example of instrumentation consistent with this invention is described in more detail below. Both the instrumentation and performance analyzer 106 may comprise "performance analysis."

Methods and systems consistent with this invention analyze the performance of program 108, which is executed in data processing system 100. Such methods and systems assign a semantic to the performance of program 108, and measure the level of performance of the program based on the semantic. For instance, the semantic may take the form of a "class" and a "suctitude," which is a degree of poor performance associated with the class. The class indicates the type of processing in terms that are meaningful in the context of application 108. For example, in a scientific application, classes may include "input," "matrix multiplication," and "output." For multiprocessor computer systems, a class may be "idle processor," or "stalled processor." Another class may be "cache misses," which occur when a cache memory for storing variable data is overwritten with other data. Other classes may be "sorting," "searching," "convolution," or "decryption." Essentially, a class may be anything that could contribute to the poor performance of a computer program, and not all classes consistent with this invention are listed here.

The suctitude indicates the degree to which the class constitutes a performance problem, where higher values may indicate larger problems. For example, if the class were "idle processor," the suctitude may be defined as one. Thus, if processor 116 were idle, this would produce a calculated suctitude of one per unit of time. Ten idle processors would produce a calculated suctitude of 10 per unit of time. The suctitude of "stalled processor" may be 10, larger than the suctitude of an "idle processor," because a stalled processor is more of a performance impediment than an idle processor. The unit of the elapsed time may be seconds, for example.

The user of performance analyzer 106 may dynamically indicate the classes that he or she believes is important for analysis, i.e., the classes he or she believes may inhibit good performance. Further, the user may dynamically define the suctitudes associated with the classes, reflecting his or her belief of the relative suctitude of the different classes. Alternatively, the classes and suctitudes are already indicated or defined in performance analyzer 106 by the software vendor.

Methods and systems consistent with this invention may divide classes into subclasses. For example, if the class were "stalled processor," the subclasses could be (1) "stalled as a result of user," or (2) "stalled as a result of system 100 activity." Processor 116 may stall as a result of system 100 activity if, for instance, processor 116 is waiting for input/output to complete (or waiting for access to data), waiting for system resources to be assigned, or waiting for a dependent piece of the program to complete. Processor 116 may stall as a result of user activity, for instance, if processor 116 is waiting for the user to input information through input device 122.

Methods and systems consistent with this invention may also indicate a plurality of classes of which to measure performance, and define a suctitude associated with each class. Such methods and systems may also calculate the aggregate suctitude. The aggregate suctitude at any given time is the sum of the calculated suctitudes of all classes.

A class's defined suctitude may be a constant or it may be a function of other execution data. For example, an idle processor may have a constant suctitude per unit time, while other classes, such as "matrix multiplication," may have a defined suctitude that is a function of the amount of work done and the time taken to do the work. In matrix multiplication, a square matrix M may have N rows and columns. The amount of time taken to square this matrix (matrix multiplication) may be proportional to the cube of the size of the matrix, or $N^3$. Therefore, the suctitude may be a function defined by $B=T-N^3$, where B is the suctitude and T is the total time it took for the matrix multiplication. If N were 10, and if the total amount of time T to square the matrix were 1000 units, the calculated suctitude B would be zero. If, on the other hand, the total amount of time T to square that matrix were 4000 units, then the suctitude B would be 3000. To the extent to which it takes more time than expected to perform the matrix multiplication, the higher the calculated suctitude.

The "matrix multiplication" class is used here to describe one example of performance instrumentation. When program 108 enters matrix multiplication subroutine, it records in secondary storage 120 (1) a start time when it entered the subroutine, and (2) the size of matrix M. When program 108 leaves matrix multiplication subroutine, it records (3) a leave time in secondary storage device 120. Performance analyzer 106 may analyze this data at a later time after program 108 finishes execution. Program 108 is instrumented to record all the data necessary for performance analyzer 106 to perform the semantic analysis described above. In this instance, performance analyzer 106 knows the size of matrix M and the amount of time it took perform the matrix multiplication and can calculate the suctitude. Because the suctitude may not be calculated during the execution of the program, the user may dynamically indicate and define the classes and suctitudes, as described above. The other classes in program 108 may similarly be instrumented, ensuring that the necessary data for the suctitudes to be calculated is recorded in secondary storage 120.

An example of an instrumented matrix multiplication subroutine follows:

```
SUBROUTINE MATRIX_MULT(N,A,B,C)
    DOUBLE PRECISION A(N,N), B(N,N), C(N,N)
    INTEGER*8 START_NSEC, END_NSEC
    INTEGER*8 GETHRTIME !$PRAGMA C (GETHRTIME)
    START_NSEC = GETHRTIME( )
    DO 30,J = 1, N
        DO 20, L = 1, K
            TEMP = ALPHA*B(L,J)
            DO 10, I = 1, M
                C(I,J) = C(I,J) + TEMP*A(I,L)
10          CONTINUE
20      CONTINUE
30  CONTINUE
    END_NSEC = GETHRTIME( )
    CALL SAVE_START_STOP_AND_SIZE(START_NSEC,
    END_NSEC, N)
    END
```

This subroutine multiplies a matrix A by a matrix B and stores the result in a matrix C. Matrices A, B, and C are square of size N. Variable START_NSEC stores the time the subroutine starts, and variable $END_{13}$ NSEC sores the time the subroutine ends. Subroutine $SAVE_{13}$ START_STOP_AND_SIZE stores the variables $START_{13}$ NSEC, $END_{13}$ NSEC, and N to secondary storage device 120 so that performance analyzer may analyze this data at a later time. An example of the data stored to secondary storage device 120 follows:

12003

5261964

10

The first number 12003 is the start time of the matrix multiplication subroutine; the second number 5261964 is the end time of the matrix multiplication subroutine; and the last number 10 may be the size of the matrix multiplied.

Other classes whose suctitudes may be defined as a function of other execution data are "cache misses," "input," and "output." For example, if the class were "cache misses," five percent of memory requests ending up in cache misses may result in a calculated suctitude of 5 per unit time. If the class were "input" or "output," the suctitude may be defined as a function of the amount of data input or output during a unit of time.

In a multiprocessor environment, two of the factors in the total performance of analyzed program 108 are (1) the amount of time spent waiting for another processor to finish, and (2) the amount of time spent executing code that cannot be executed in parallel. An example of code in a multiprocessor environment follows:

```
CALL READ_DATA(N,A)          !   Single CPU only
CALL PROCESS_DATA(N,A)       !   Multiple CPUs
CALL WAIT_FOR_ALL_CPUS_TO_FINISH
```

Subroutine READ_DATA may be code that cannot be executed in parallel; subroutine PROCESS_DATA may efficiently execute in parallel processors; and subroutine WAIT_$FOR_{13}$ ALL_CPUS_TO_FINSH is executed while waiting for all the CPUs to finish executing code. Such a code may be instrumented by storing in secondary storage device 120 (1) the amount of time spent in READ_DATA, and (2) the amount of time spent in WAIT_FOR_ALL_CPUS_TO_FINISH, and then assigning a suctitude to each. READ_DATA may have a higher defined suctitude relative to WAIT_FOR_ALL_CPUS_TO_FINSH because single-CPU regions may be more of a performance impediment to parallel performance than synchronization.

Once the execution data has been gathered and suctitudes defined, performance analyzer 106 may use the calculated suctitude data to identify performance impediments in program 108. Methods and systems consistent with this invention display the calculated suctitude of a class as a function of time. In this case, the display may be a line graph with the suctitude on the ordinate, or Y-axis, and time on the abscissa, or X-axis. U.S. Pat. No. 6,434,714, entitled "Methods, Systems, and Articles of Manufacture for Analyzing Performance of Application Programs," hereby incorporated by reference, describes ways of displaying performance analysis results. Performance analyzer 106 may display the calculated aggregate suctitude of all the classes as a function of time, or it may display the calculated suctitude of only one or a select few classes. Thus, the user may isolate the suctitude of a particular class.

Alternatively, methods and systems consistent with this invention display when the calculated suctitude of a class or group of classes exceeds a threshold. Or, performance analyzer 106 may indicate when during execution in the program the calculated suctitude reached a maximum. The calculated suctitude may be displayed as a, color, with different colors representing different numerical levels of calculated suctitude.

Figure 2A:
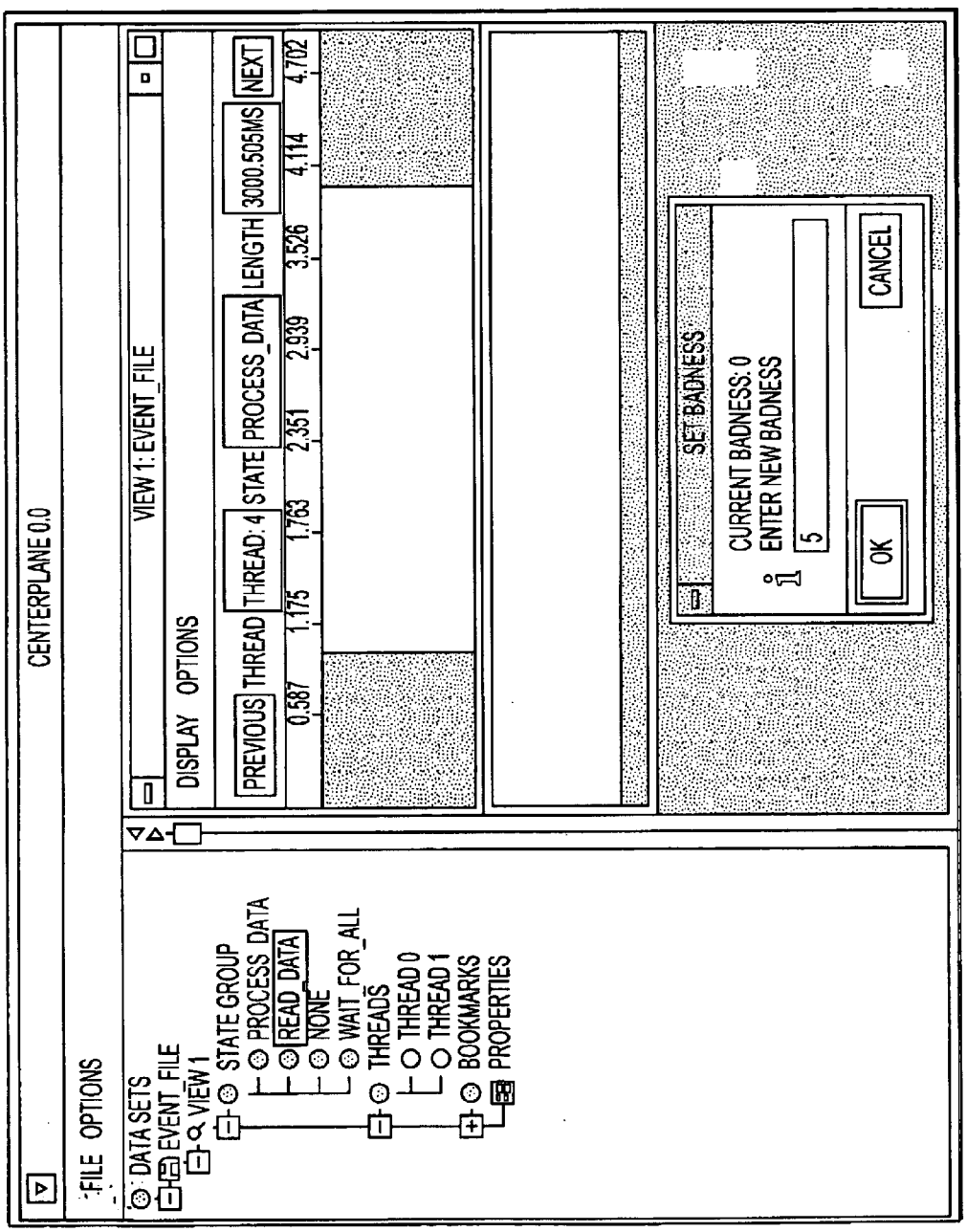
FIGS. 2A, 2B, and 2C are exemplary displays, consistent with this invention, for providing output results of a performance analyzer.
Figure 2B:
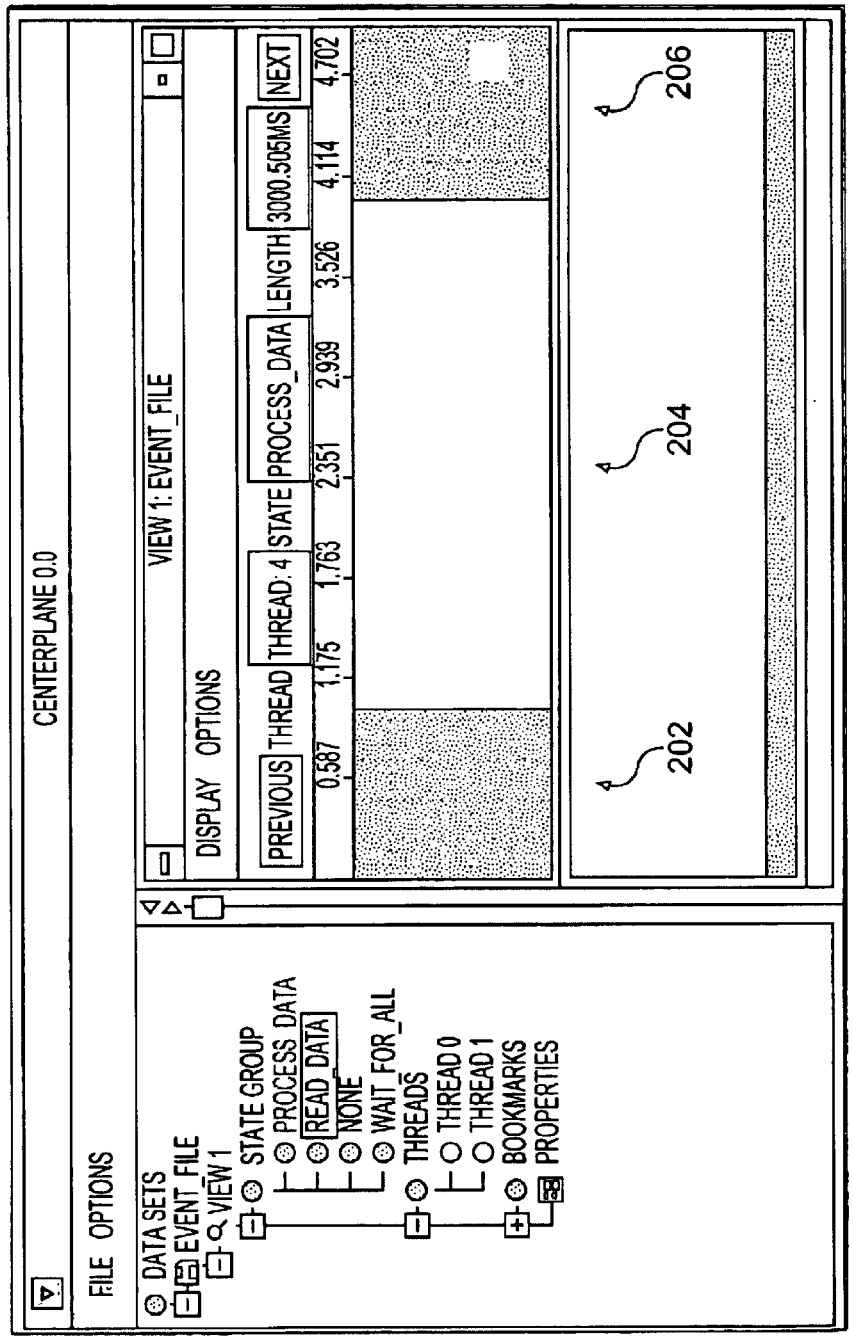
Figure 2C:
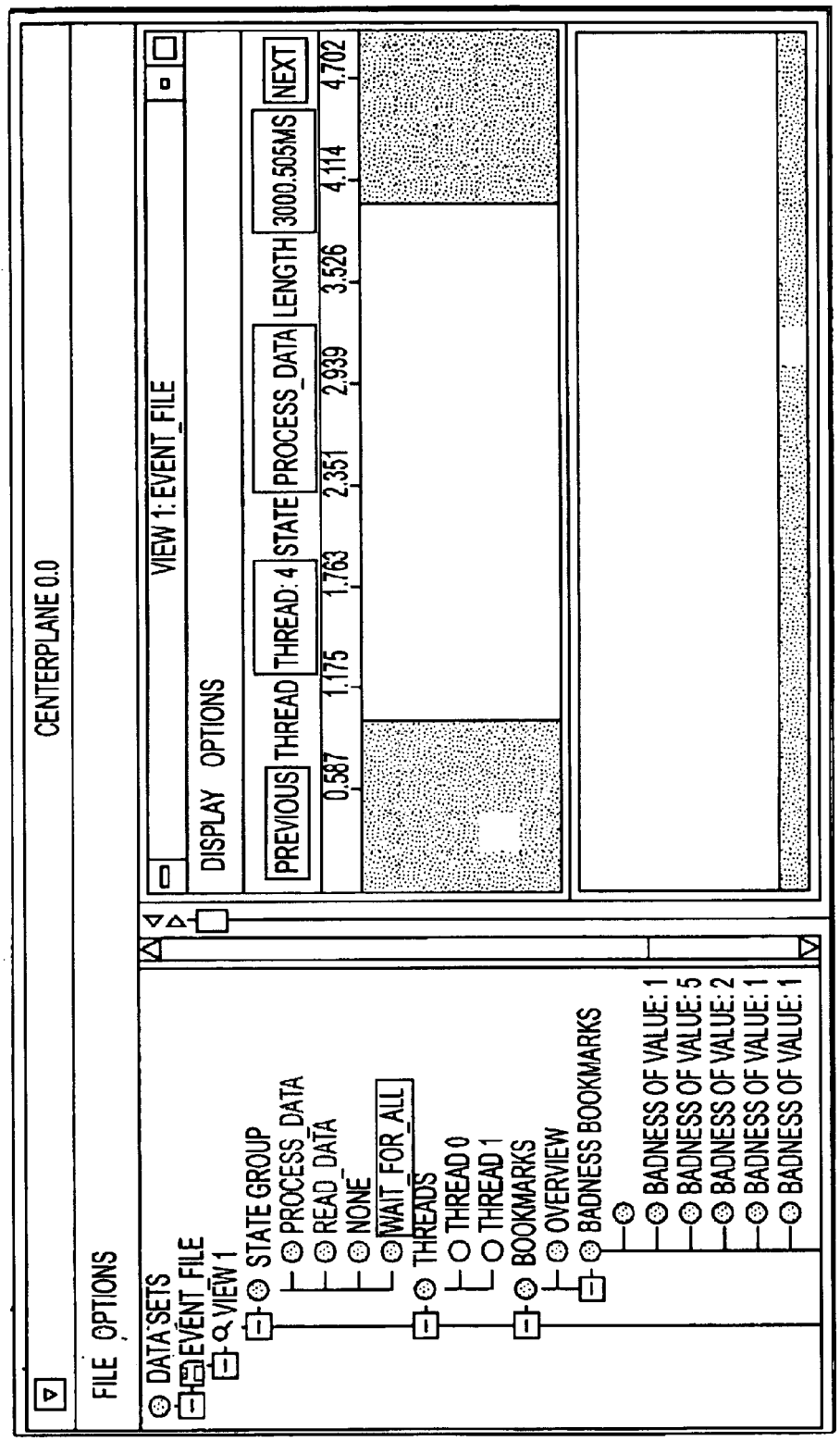

FIGS. 2A, 2B, and 2C are exemplary displays, consistent with this invention, for providing output results of performance analyzer 106 after analyzing the multiprocessor code example provided above. In FIGS. 2A, 2B, and 2C, the word "badness" is synonymous with suctitude. As shown in FIG. 2A, a user of performance analyzer 106 may define the READ_DATA subroutine suctitude to "5" in the "Set Badness" dialog box. The user may also define the suctitudes for the other routines in a similar fashion. For example, the suctitude of PROCESS_DATA may be defined as zero, and the suctitude of WAIT_FOR_ALL_CPUS_TO_FINISH may be defined as one. FIG. 2B shows the calculated suctitude with respect to time. Area 202 is the time period when subroutine READ_DATA executes; area 204 is the time period when PROCESS_DATA executes; and area 206 is the area when WAIT_FOR_ALL_CPUS_TO_FINISH executes. Area 202 is dark, showing a calculated suctitude of 5; area 204 is white, showing a suctitude of zero; and area 206 is light gray, showing a suctitude of one. FIG. 2C shows suctitude bookmarks 208, where the suctitude ranges between 1 and 5. Bookmarks 208 direct the user of performance analyzer 106 to particular areas of suctitude.

Figure 3:
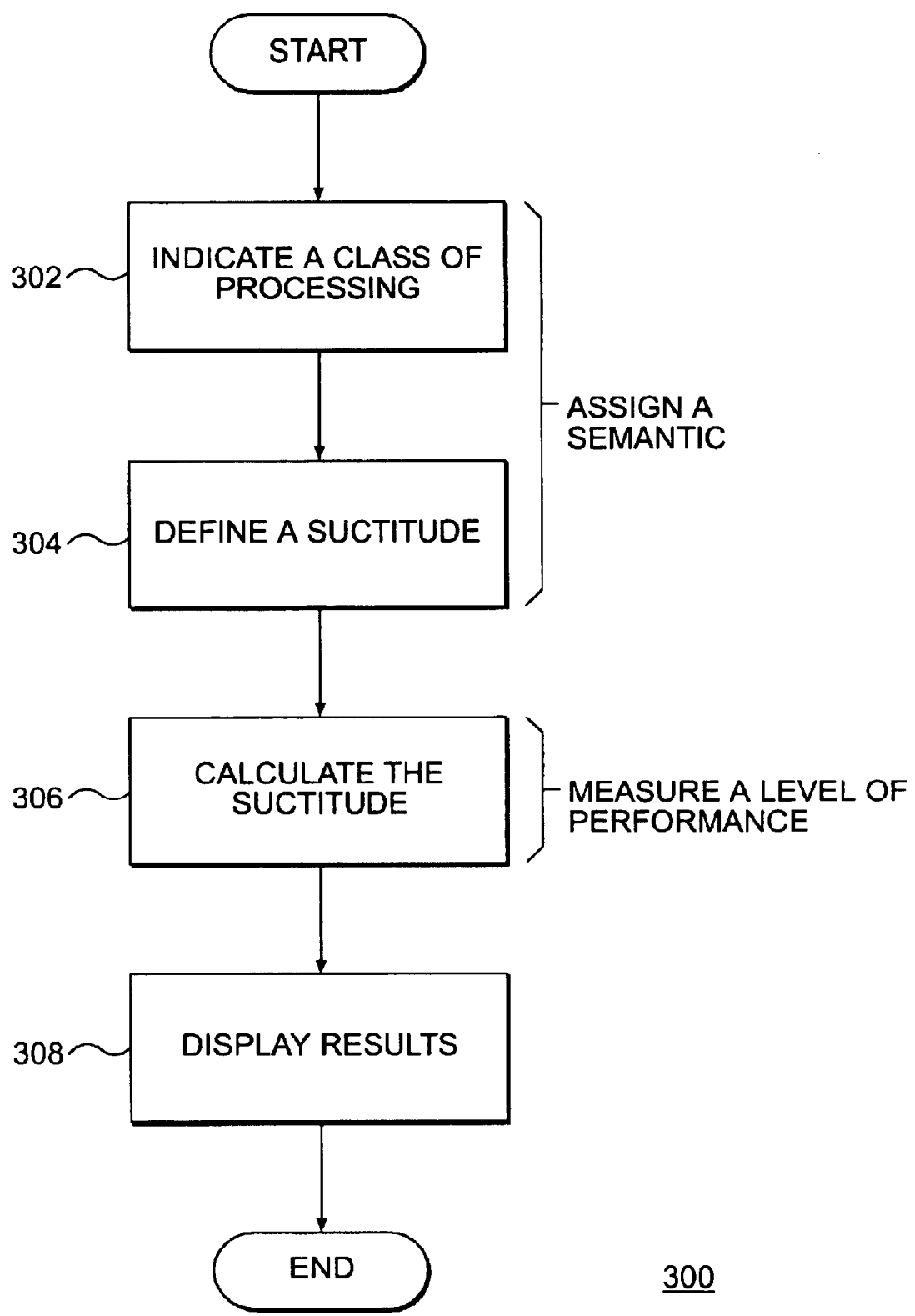
FIG. 3 is a flowchart of a process, consistent with this invention, for analyzing the performance of a program executed in the data processing system of FIG. 1.

FIG. 3 is a flowchart of a process, consistent with this invention, for analyzing the performance of a program executed in data processing system 100. First, methods and systems consistent with this invention indicate a class of processing (step 302). Then such methods and system define a suctitude associated with the class indicated in step 302 (step 304). Steps 302 and 304 may be considered as assigning a semantic to the performance of a program. Such methods and systems then calculate the suctitude during an execution of the program (step 306). Calculating the suctitude in step 306 may be considered measuring the level of performance, which is then displayed as the result of the analysis (step 308). Process 300 may be implemented by program analyzer 106 that resides in main memory 104. Program analyzer may be stored on a computer-readable medium, such as secondary storage device 120. Therefore, the computer-readable medium may contain instructions for controlling computer system 100 to perform process 300 as a method of operating processors 116 or 118.

Systems consistent with this invention are applicable to all programs written in all computer programming languages, including Fortran 77, Fortran 95, Java, C, C++, and assembler for any given computer.

One skilled in the art appreciates that numerous variations to this system exist. For example, the performance data may be tabulated and displayed in any fashion. Although methods and systems consistent with this invention have been described with reference to a preferred embodiment thereof, those skilled in the art know various changes in form and detail which may be made without departing from the spirit and scope of this invention as defined in the appended claims and their full scope of equivalents.

What is claimed is:

1. A method for analyzing a performance of a program executed in a data processing system, the method comprising:

assigning a semantic to the performance of the program; and measuring the performance of the program based on the semantic, wherein the performance is a function of an expected performance.

2. The method of claim 1, wherein assigning the semantic comprises indicating a class of processing of which to measure performance; and calculating a suctitude associated with the class during program execution.

3. The method of claim 2, wherein the suctitude indicates a performance problem associated with the class.

4. The method of claim 2, wherein the suctitude is a function of work done in a period of time and an expected work done in the period of time.

5. The method of claim 2, wherein the suctitude is a function of time.

6. The method of claim 2, wherein the suctitude is a function of execution data.

7. The method of claim 2, wherein the suctitude is a function of work done and expected work done.

8. The method of claim 2, further comprising:

displaying a level of the suctitude of the class as a function of time.

9. The method of claim 2, further comprising:

displaying when a level of the suctitude of the class exceeds a threshold.

10. The method of claim 2, wherein the class is one of input, matrix multiplication, output, idle processor, stalled processor, sorting, searching, convolution, decryption, and cache misses.

11. The method of claim 2, wherein the class of processing is a function of processing that contributes to the poor performance of the program.

12. The method of claim 2, wherein indicating a class comprises indicating a plurality of classes of processing of which to measure performance; and wherein defining the suctitude comprises defining a suctitude associated with each class.

13. The method of claim 2, further comprising:

displaying an aggregate of suctitude of the plurality of classes as a function of time.

14. The method of claim 2, further comprising:

displaying when a total level of the suctitude of the plurality of classes exceeds a threshold.

15. The method of claim 2, further comprising:

instrumenting the program to allow the measuring of the suctitude for the class.

16. An apparatus for analyzing performance of a program, the system comprising:

a processor configured to perform
      assigning a semantic to the performance of the program; and
      measuring the performance of the program based on the semantic,
         wherein the performance is a function of an expected performance.

17. The apparatus of claim 16, wherein assigning the semantic comprises indicating a class of processing of which to measure performance; and calculating a suctitude associated with the class during program execution.

18. The apparatus of claim 17, wherein the suctitude indicates a performance problem associated with the class.

19. The apparatus of claim 17, wherein the suctitude is a function of work done in a period of time and an expected work done in the period of time.

20. The apparatus of claim 17, wherein the suctitude is a function of time.

21. The apparatus of claim 17, wherein the suctitude is a function of execution data.

22. The apparatus of claim 17, wherein the suctitude is a function of work done and expected work done.

23. The apparatus of claim 17, further comprising:

a display to display a level of the suctitude of the class as a function of time.

24. The apparatus of claim 17, further comprising:

a display to display when a level of the suctitude of the class exceeds a threshold.

25. The apparatus of claim 17, wherein the class is one of input, matrix multiplication, output, idle processor, stalled processor, sorting, searching, convolution, decryption, and cache misses.

26. The apparatus of claim 17, wherein the class of processing is a function of processing that contributes to the poor performance of the program.

27. The apparatus of claim 17, wherein the processor is further configured to indicate a plurality of classes of processing of which to measure performance; and define a suctitude associated with each of the plurality classes.

28. The apparatus of claim 17, further comprising:

a display to display the total level of the suctitude of the plurality of classes as a function of time.

29. The apparatus of claim 17, further comprising:

a display to display when a total level of the suctitude of the plurality of classes exceeds a threshold.

30. The apparatus of claim 17, wherein the program comprises instrumented lines of code to allow the measuring of the suctitude for the class.

31. A computer-readable medium comprising instructions for controlling a computer system to perform a method of operating a processor, the method comprising:

assigning a semantic to the performance of the program; and measuring the performance of the program based on the semantic, wherein the performance is a function of an expected performance.

32. The computer-readable medium of claim 31, wherein assigning a semantic comprises indicating a class of processing of which to measure performance;

calculating a suctitude associated with the class during program execution.

33. The computer-readable medium of claim 32, wherein the suctitude indicates a performance problem associated with the class.

34. The computer-readable medium of claim 32, wherein the suctitude is a function of work done in a period of time and an expected work done in the period of time.

35. The computer-readable medium of claim 32, wherein the suctitude is a function of time.

36. The computer-readable medium of claim 32, wherein the suctitude is a function of execution data.

37. The computer-readable medium of claim 32, wherein the suctitude is a function of work done and expected work done.

38. The computer-readable medium of claim 32, wherein the method further comprises:

displaying a level of the suctitude of the class as a function of time.

39. The computer-readable medium of claim 32, wherein the method further comprises:

displaying when a level of the suctitude of the class exceeds a threshold.

40. The computer-readable medium of claim 32, wherein the class is one of input, matrix multiplication, output, idle processor, stalled processor, sorting, searching, convolution, decryption, and cache misses.

41. The computer-readable medium of claim 32, wherein the class of processing is a function of processing that contributes to the poor performance of the program.

42. The computer-readable medium of claim 32, wherein indicating a class comprises indicating a plurality of classes of processing of which to measure performance; and wherein defining the suctitude comprises defining a suctitude associated with each class.

43. The computer-readable medium of claim 32, wherein the method further comprises:

displaying an aggregate of the suctitude of the plurality of classes as a function of time.

44. The computer-readable medium of claim 32, wherein the method further comprises:

displaying when a total level of the suctitude of the plurality of classes exceeds a threshold.

45. The computer-readable medium of claim 32, wherein the method further comprises:

instrumenting the program to allow the measuring of the suctitude for the class.

* * * * *

UNITED STATES PATENT AND TRADEMARK OFFICE
CERTIFICATE OF CORRECTION

PATENT NO. : 6,957,208 B1
DATED : October 18, 2005
INVENTOR(S) : Michael L. Boucher et al.

It is certified that error appears in the above-identified patent and that said Letters Patent is hereby corrected as shown below:

Column 7,
Lines 24-25, "an expected performance." should read -- work done and expected work done. --.
Lines 41-42, delete the claim in its entirety.

Column 8,
Lines 11-12, "an expected performance." should read -- work done and expected work done. --.
Line 27-28, delete the claim in its entirety.
Line 44, "plurality classes." should read -- plurality of classes. --.
Lines 60-61, "an expected performance." should read -- work done and expected work done. --.

Column 9,
Lines 12-14, delete the claim in its entirety.

Signed and Sealed this

Twenty-seventh Day of December, 2005

JON W. DUDAS
*Director of the United States Patent and Trademark Office*